Aug. 25, 1925.
H. LAW
1,550,973
TIRE CARRIER FOR MOTOR VEHICLES
Filed June 6, 1921
2 Sheets—Sheet 1
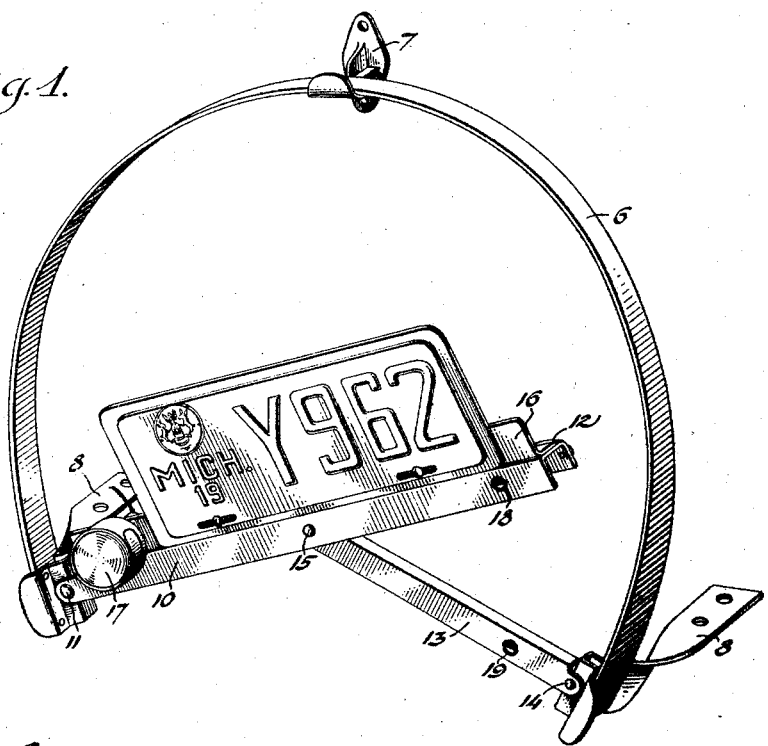
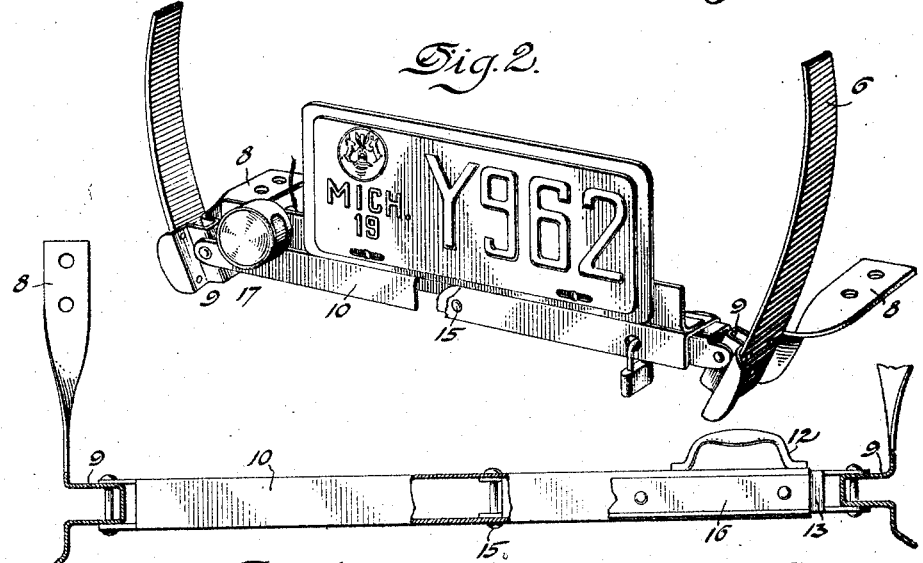
Inventor:
Hugh Law
By his Attorneys:
Blackmore, Spencer & Flint
Witness:

Aug. 25, 1925.  1,550,973
H. LAW
TIRE CARRIER FOR MOTOR VEHICLES
Filed June 6, 1921  2 Sheets-Sheet 2

Inventor:
Hugh Law
By his Attorneys

Patented Aug. 25, 1925.

1,550,973

UNITED STATES PATENT OFFICE.

HUGH LAW, OF MUNCIE, INDIANA, ASSIGNOR TO GENERAL MOTORS CORPORATION, OF DETROIT, MICHIGAN, A CORPORATION OF DELAWARE.

TIRE CARRIER FOR MOTOR VEHICLES.

Application filed June 6, 1921. Serial No. 475,275.

*To all whom it may concern:*

Be it known that I, HUGH LAW, a citizen of the United States, and a resident of Muncie, county of Delaware, and State of Indiana, have invented certain new and useful Improvements in Tire Carriers for Motor Vehicles, of which the following is a full, clear, concise, and exact description, such as will enable others skilled in the art to which the invention relates to make and use the same, reference being made therein to the accompanying drawings, which form a part of this specification.

My invention relates to tire carriers designed for use with automobiles and similar self-propelled vehicles for the purpose of holding an extra tire, and particularly to tire carriers of the type designed to support an extra or auxiliary rim with a tire in place thereupon; the tire and rim being assembled as a unit and handled as such in placing them upon the felly of a wheel of the vehicle, should it become necessary to do so.

The principal object of my invention is to provide a tire carrier of the type or class above referred to, and wherein the rim and tire carried thereby are supported by an expansible supporting member adapted to lie within the rim, and which member may be collapsed to permit the removal of the rim from the tire carrier and expanded to engage the interior of the rim and hold it securely in place.

A further object of my invention is to provide an improved tire carrier in which the means whereby the collapsible and expansible rim and tire supporting member is operated serves also as a support for a license plate and for a tail light.

A further object of my invention is to provide an improved tire carrier of the type above referred to and wherein the expansible and collapsible rim supporting member and elements cooperating therewith require no nice or close adjustment, either initially or after the carrier is in use, in order to adapt the carrier to the rim supported thereby; and in which rims varying in size throughout a considerable range may be supported by a particular tire carrier, and without the necessity of varying the adjustment of the carrier relative to the rim and tire to be supported.

A further object of my invention is to provide an improved tire carrier of the type wherein a rim and tire thereupon are supported by an expansible and collapsible supporting member which engages the interior of the rim, and the construction of which is such that the valve through which air is supplied to the tire is entirely free of the said supporting member; and in which no special care has to be taken in positioning the air supply valve relative to the rim in placing the rim thereupon, as the said valve does not extend through a hole in the supporting member as has heretofore been the case in tire carriers of the general type to which my invention relates.

With the above and other objects of invention in view, my invention consists of the improved tire carrier illustrated in the accompanying drawings and hereinafter described and claimed, and any such variations and modifications thereof, within the scope of the concluding claims, as will be obvious to those skilled in the art of which my invention relates.

In the drawings accompanying and forming a part of this specification, and wherein the preferred embodiment of my invention is illustrated;

Figure 1 is a view showing my improved tire carrier detached from the vehicle, and in perspective, the rim supporting member thereof being collapsed;

Figure 2 is a similar view showing a portion only of the tire carrier, the rim supporting member thereof being in its expanded condition;

Figure 3 is a view showing the toggle lever mechanism employed in my improved tire carrier for collapsing and expanding the supporting member thereof, in plan;

Figure 5:
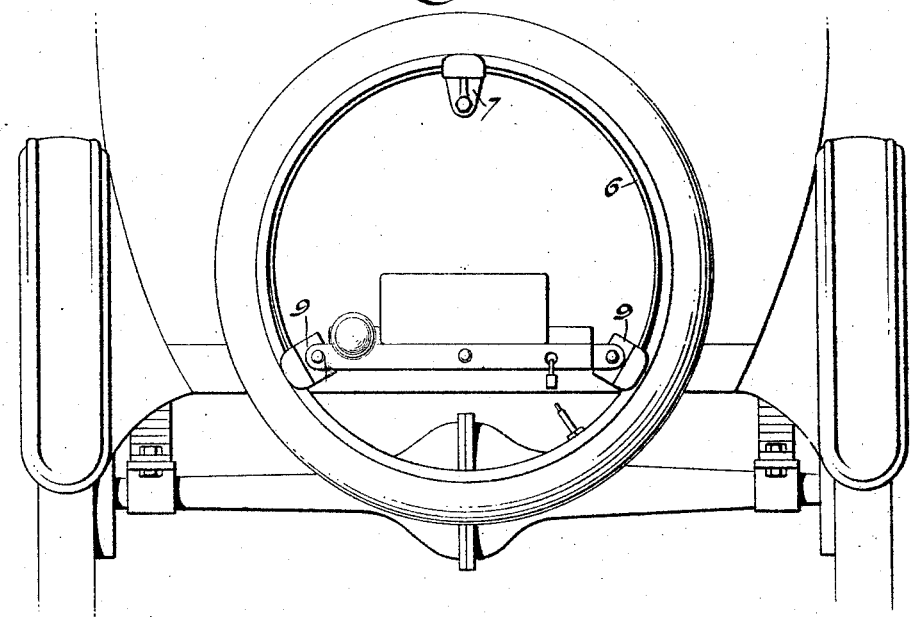
Figure 5 is a view showing my improved tire carrier in end elevation, and as attached to the rear end of the vehicle and as the same appears from position behind the vehicle.
Figure 4:
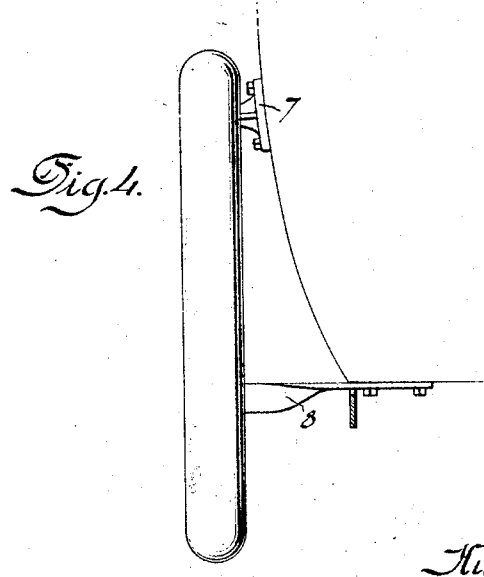
Figure 4 is a view showing my improved tire carrier in side elevation, and as attached to the rear of a motor vehicle.

Referring now to the drawings, the reference numeral 6 designates a collapsible and expansible rim supporting member adapted to fit within the rim of the combined tire and rim supported by the carrier, and which member contacts with the interior of the rim throughout the greater portion of its length as will be understood from Figure 5 of the drawing; although as will hereinafter appear the free lower ends of the said member are bent inward from the inner surface of the rim, so as to avoid the necessity of adjusting the carrier relative to the rim and to provide a carrier upon which rims varying considerably in diameter may be supported. This supporting member is curved in form, and the length thereof is considerably less than that of the inner circumference of the rim to be supported, so that the free lower ends of the rim are spaced apart some considerable distance from one another in all conditions of the said supporting member. That is, the space between the said two ends when the supporting member is in its expanded condition shown in Figure 2, as well as when the carrier is in the collapsed position in which it is shown in Figure 1, is comparatively great; and is in fact approximately one-fourth the length of the inner periphery of the rim in the specific embodiment of my invention illustrated.

The collapsible rim supporting member thus provided is supported from the rear end of the vehicle in the embodiment of my invention illustrated by means of a fixed support or bracket 7 secured to the vehicle body, and to which fixed support the middle and upper portion of said supporting member is secured. The tire carrier and tire and rim carried thereby are supported principally by the bracket 7, although additional support is provided and the lower free ends of the supporting members are steadied by means of two flexible arms 8, the free outer ends of which are secured to the free ends of the supporting member, and the inner ends of which are secured in fixed positions relative to the body and frame of the car; as, for example, by securing the inner fixed ends of said member to the under side of the body of the vehicle, or to the upper side of the frame, or otherwise as determined by the choice of the designer or the structural features of the vehicle to which the carrier is to be applied in each particular case.

The arms 8 are sufficiently flexible to permit the inward and outward movements to which the lower free ends of the supporting member are subjected as said member is collapsed to permit the tire to be removed from the carrier, and expanded to cause said member to contact with the interior of the rim; and the end portions of said arms which are secured to the free ends of the supporting member are preferably bent to provide lugs 9 for facilitating the connection of the toggle lever mechanism employed in the preferred form of my invention illustrated with the free ends of the supporting member, to thereby provide for the expanding and collapsing of the said member.

The lower free ends of the supporting member are moved toward and from one another to thereby collapse and expand the same by means of toggle lever mechanism comprising a channel shaped toggle lever 10 one end of which is pivotally connected at 11 with the lug 9 of one of the flexible arms 8, and which lever extends substantially the entire distance across the lower portion of the supporting member and is provided with an operating handle 12 adjacent its free end. A second toggle lever 13 is pivotally connected at 14 with the lug 9 of the other flexible arm 8, and the inner end of said last mentioned lever is pivotally connected at 15 with the toggle lever 10 above referred to; the point of pivotal connection between the two toggle levers and about which they break in collapsing the rim supporting member being central with reference to the toggle lever 10, and with reference to the free ends of the rim supporting member, as clearly shown in the drawings.

The toggle lever 13 is narrower than the toggle lever 10 so that it will fit within the channel of said last mentioned lever when the toggle mechanism is straightened to expand the supporting member, as will be understood from Figures 2 and 3 of the drawings; and the longer toggle lever is provided with an upwardly extending ledge or flange 16 to which a license plate may be secured, thus providing for the display of the license plate centrally of the vehicle and within the spare tire and rim supported by the carrier. Said lever 10 is also preferably provided with means for supporting a tail light 17, which lamp is also located within the side lines of the vehicle and in a position adjacent the license plate and in which it may be readily seen, as will be appreciated.

The toggle levers 10 and 13 are preferably provided with holes 18 and 19 which register with one another when the supporting member is expanded, as shown in Figure 2, and through which holes the hasp of a pad lock may be passed to thereby lock the toggle mechanism and prevent the removal of the tire and rim by unauthorized persons.

While I have illustrated and described a particular form of toggle mechanism for expanding and contracting the supporting member of my improved tire carrier it will be appreciated that forms and constructions of toggle or equivalent mechanism other than such as comprises the channel shaped levers above referred to may be employed, so long as the mechanism used in each particular case is one whereby the expanding and contracting of the free ends of the supporting member may be accomplished. Furthermore, it will be appreciated that the toggle or like expanding mechanism is not necessarily one which also performs the function of supporting the license plate and tail lamp, as these elements may as a matter of course be supported from the vehicle by supports provided especially for that purpose.

In view of the premises it will be appreciated that the supporting member 6 of my improved tire carrier may be readily collapsed by pulling upward upon the operating handle 12, thus moving the toggle mechanism from the expanded position in which it is shown in Figure 2 into the collapsed position in which it is shown in Figure 1. This movement of toggle mechanism draws the free lower ends of the supporting member toward one another, thus leaving the rim and tire carried thereby loose upon the carrier but supported from the bracket 7 at the upper end thereof. After collapsing the supporting member as above explained the rim and tire may be readily removed from the carrier, as will be appreciated, and the rim and tire removed from the wheel replaced upon the carrier. In placing a rim and tire upon the carrier it will be appreciated that no particular care has to be taken as to the location of the air valve through which air is supplied to the tire, as such valve may lie anywhere between the free lower ends of the supporting member 6 as shown in Figure 5; and does not have to be carefully passed through a hole in a rim supporting member, as has heretofore been the case in tire carriers wherein a rim and tire are supported from a continuous unbroken band located within the tire and rim.

The lower free ends of the rim supporting member 6 are deflected inward from a circumscribing circle corresponding with the inner periphery of the rim supported by the carrier, as shown in Figure 5, so that the said free ends provide in effect yielding members which are flexed during the terminal movements of the said free ends and as the toggle is straightened; and which act as springs to hold the main part of the said supporting member in firm contact with the interior of the rim supported by the carrier.

The action of the lower ends of the rim supporting member in forcing the main portion thereof against the interior of the rim with a yielding or spring action provides a carrier in which looseness between the rim and supporting member is automatically taken up, and in which movement or rattling of the rim upon the carrier is prevented. Furthermore, the yielding or spring actions of the lower ends of the rim supporting member provides a carrier which does not have to be carefully adjusted relative to the rim to be supported, either initially in installing the carrier or after it has been in use, or relative to rims of different manufactures and which often vary considerably in size; as the said spring arms will obviously yield to an extent sufficient to permit the toggle mechanism to be straightened and locked after the supporting member has contacted with the interior of the rim throughout the greater part of its length, even though the rim thus held upon the carrier may vary considerably in size from that of an assumed standard or normal size or internal diameter of the rim.

While in the form of my invention illustrated the carrier is supported in a position at the rear of the vehicle it will be appreciated that this is a feature of secondary importance, and that the same may be supported at the side or elsewhere about the vehicle, as my invention comprehends the tire carrying structure itself irrespective of the position which it occupies relative to the body of the vehicle; and it will be further appreciated that various changes may be made in the specific embodiment of my invention illustrated without departing from the spirit thereof, so long as such changes come within the scope of the following claims wherein the particular features of my invention are pointed out.

Having thus described and explained my invention, I claim and desire to secure by Letters Patent:

In a tire carrier of the class described, a collapsible and expansible rim supporting member curved in form and adapted to fit within and contact with the interior of a rim to be supported, and the length of which member is substantially less than the inner circumference of the rim so that the free ends of said supporting member are spaced apart from one another to a considerable extent when the same is in its collapsed as well as when in its expanded condition; a fixed support to which the middle portion of said supporting member is secured; two flexible arms one end of each of which is held in a fixed position, and the free ends of which are provided each with a lug and are connected adjacent said lugs one with each of the free ends of the said rim supporting member; a channel shaped toggle lever one end of which is pivotally connected with one of the lugs aforesaid, and the other end of which is provided with an operating handle, and the length of which toggle lever corresponds, approximately, with the distance between the free ends of said rim supporting member; and a second toggle lever adapted to lie within the channel of said first mentioned lever and the two ends of which are pivotally connected one with said first mentioned toggle lever adjacent the middle portion thereof and the other with the other of said lugs.

In testimony whereof I affix my signature.

HUGH LAW.